US008782617B2

(12) United States Patent
Kim

(10) Patent No.: US 8,782,617 B2
(45) Date of Patent: Jul. 15, 2014

(54) APPARATUS AND METHOD FOR TRANSLATING OPEN VECTOR GRAPHIC APPLICATION PROGRAM INTERFACE

(75) Inventor: Young Ouk Kim, Gunpo-si (KR)

(73) Assignee: Core Logic Inc., Seoul (KR)

( * ) Notice: Subject to any disclaimer, the term of this patent is extended or adjusted under 35 U.S.C. 154(b) by 1830 days.

(21) Appl. No.: 11/843,438

(22) Filed: Aug. 22, 2007

(65) Prior Publication Data
US 2008/0134218 A1 Jun. 5, 2008

(30) Foreign Application Priority Data
Dec. 1, 2006 (KR) .......................... 10-2006-0120429

(51) Int. Cl.
*G06F 9/44* (2006.01)
*G06F 9/45* (2006.01)

(52) U.S. Cl.
USPC ............ 717/136; 717/106; 717/115; 719/328

(58) Field of Classification Search
CPC ............... G06F 8/51; G06F 8/10; G06F 8/20; G06F 8/30; G06F 8/34; G06F 8/36; G06F 8/85
See application file for complete search history.

(56) References Cited

U.S. PATENT DOCUMENTS

| | | | | |
|---|---|---|---|---|
| 6,675,377 B1 * | 1/2004 | Tanaka | | 717/152 |
| 6,957,439 B1 * | 10/2005 | Lewallen | | 719/328 |
| 6,993,476 B1 * | 1/2006 | Dutta et al. | | 704/9 |
| 7,055,095 B1 * | 5/2006 | Anwar | | 715/206 |
| 7,325,229 B2 * | 1/2008 | Nicolle | | 717/136 |
| 7,486,294 B2 * | 2/2009 | Beda et al. | | 345/473 |
| 7,500,229 B2 * | 3/2009 | Tanaka et al. | | 717/136 |
| 7,542,846 B2 * | 6/2009 | Motoyama et al. | | 701/454 |
| 7,600,022 B2 * | 10/2009 | Takamine | | 709/226 |
| 7,669,183 B2 * | 2/2010 | Bowman et al. | | 717/113 |
| 7,774,746 B2 * | 8/2010 | Mansfield et al. | | 717/106 |
| 7,784,036 B2 * | 8/2010 | Tjong et al. | | 717/136 |
| 7,856,244 B2 * | 12/2010 | Lee et al. | | 455/550.1 |
| 7,908,594 B2 * | 3/2011 | Varanasi et al. | | 717/136 |
| 8,032,837 B2 * | 10/2011 | Bowman et al. | | 715/760 |
| 8,451,275 B2 * | 5/2013 | Lee et al. | | 345/473 |
| 2003/0098862 A1 * | 5/2003 | Hunt et al. | | 345/418 |
| 2004/0044991 A1 * | 3/2004 | Eschermann et al. | | 717/120 |
| 2004/0100490 A1 * | 5/2004 | Boston et al. | | 345/744 |
| 2004/0111672 A1 * | 6/2004 | Bowman et al. | | 715/513 |
| 2004/0111673 A1 * | 6/2004 | Bowman et al. | | 715/513 |

(Continued)

OTHER PUBLICATIONS

Johansson et al., OpenVG for Moblie Equipment, Master of Science in Computer Graphics, Lund Institute of Technology 2006, May-2006, pp. 1-70.*

(Continued)

*Primary Examiner* — Tuan Q. Dam
*Assistant Examiner* — Zheng Wei
(74) *Attorney, Agent, or Firm* — Lowe Hauptman & Ham, LLP

(57) ABSTRACT

Provided are an apparatus and method for OpenVG API translation, a mobile terminal comprising the translation apparatus, and a record medium storing the translation program. The apparatus comprises a data parsing unit, an OpenVG API script creating unit, and a raster image data output unit. The data parsing unit parses SVG format data depending on a data attribute. The OpenVG API script creating unit extracts an OpenVG API format syntax and creates an OpenVG API script. The raster image data output unit creates and outputs raster image data associated with the created OpenVG API script.

20 Claims, 3 Drawing Sheets

(56) References Cited

U.S. PATENT DOCUMENTS

| | | | |
|---|---|---|---|
| 2004/0117773 A1* | 6/2004 | Nicolle | 717/136 |
| 2005/0022116 A1* | 1/2005 | Bowman et al. | 715/513 |
| 2005/0086584 A1* | 4/2005 | Sampathkumar et al. | 715/501.1 |
| 2005/0157323 A1* | 7/2005 | Narusawa et al. | 358/1.13 |
| 2005/0235272 A1* | 10/2005 | Skinner | 717/136 |
| 2006/0112167 A1* | 5/2006 | Steele et al. | 709/206 |
| 2006/0230393 A1* | 10/2006 | Doh et al. | 717/137 |
| 2007/0011439 A1* | 1/2007 | Kim et al. | 712/205 |
| 2007/0109318 A1* | 5/2007 | Tuomi | 345/611 |
| 2007/0136417 A1* | 6/2007 | Kreiner et al. | 709/203 |
| 2007/0169021 A1* | 7/2007 | Huynh et al. | 717/136 |
| 2007/0180353 A1* | 8/2007 | Hundhausen | 715/500 |
| 2007/0185651 A1* | 8/2007 | Motoyama et al. | 701/211 |
| 2007/0186005 A1* | 8/2007 | Setlur et al. | 709/231 |
| 2007/0192818 A1* | 8/2007 | Bourges-Sevenier et al. | 725/132 |
| 2007/0294674 A1* | 12/2007 | Marilly et al. | 717/136 |
| 2008/0007568 A1* | 1/2008 | Chou et al. | 345/629 |
| 2008/0062203 A1* | 3/2008 | Williams | 345/666 |
| 2008/0064447 A1* | 3/2008 | Lee et al. | 455/566 |
| 2008/0094401 A1* | 4/2008 | Lee et al. | 345/473 |
| 2008/0122866 A1* | 5/2008 | Dorbie et al. | 345/626 |
| 2008/0127062 A1* | 5/2008 | Kim | 717/106 |
| 2008/0134218 A1* | 6/2008 | Kim | 719/328 |
| 2008/0201695 A1* | 8/2008 | Zhou | 717/136 |
| 2008/0218531 A1* | 9/2008 | Chou et al. | 345/629 |
| 2009/0313293 A1* | 12/2009 | Setlur et al. | 707/102 |

OTHER PUBLICATIONS

Huang et al., Implementation of an OpenVG Rasterizer with Configurable Anti-aliasing and Multi-window Scissoring, Published on IEEE, 2006, pp. 1-6.*

Kari Pulli, New APIs for Mobile Graphics, published 2006, pp. 1-13.*

Ferraiolo et al., Scalable Vector Graphics (SVG) 1.0 Specification, W3C Recommendation Sep. 4, 2001, pp. 1-617.*

OpenVG Overview, published by Khronos Group, 2005, pp. 1-23.*

Danile Rice, OpenVG Specification Version 1.0, published on Jul. 28, 2005, pp. 1-188.*

Naohiko Yamashita, Two-dimensional graphics description by XML: fundametnal explanation on SVG, XML application technology, published by Open Design, Feb. 2003, pp. 148-153 (including english translation, pp. 1-8).*

* cited by examiner

APPARATUS AND METHOD FOR TRANSLATING OPEN VECTOR GRAPHIC APPLICATION PROGRAM INTERFACE

RELATED APPLICATIONS

This Nonprovisional application claims priority under 35 U.S.C. §119(a) to Korean Patent Application No. 10-2006-0120429 filed Dec. 1, 2006, the entire contents of which are hereby incorporated by reference.

BACKGROUND OF THE INVENTION

1. Field of the Invention

The present invention relates to open vector graphic (OpenVG) application program interface (API) translation, and more particularly, to an apparatus and method for translating OpenVG API, a mobile terminal comprising the translation apparatus, and a record medium storing the translation method.

2. Description of the Related Art

Vector graphic is the digital image created by a series of commands or mathematical statements that place lines or shapes in a given two-dimensional or three-dimensional space. In physics, a vector is a representation of both a quantity and a direction at the same time. In the vector graphics, a graphic file that results from a graphic artist's work is created and saved as a sequence of vector statements. For example, to draw a line, vector graphic file contains the information of the points to be connected instead of information of every point on the line. This results in much reduced file size. The vector graphic file is easier to modify than a raster image file.

As one kind of the vector graphics, there is Scalable Vector Graphics (SVG) which describes images based on the extensible markup language (XML). SVG is widely used in the web and is abundant in contents. However, SVG is slow in speed under a mobile environment because it processes many driving functions by using software.

Thus, in recent years, OpenVG is being used as mobile vector graphic for creating contents to be served for a mobile terminal. OpenVG led to improvement on a low rate under the mobile environment because it provides APIs which are supporting hardware acceleration to a variety of mobile terminals. However, OpenVG results in a reduction of the efficiency of image creation thereby resulting in a shortage of contents because contents developers have to create contents manually using algorithm.

SUMMARY OF THE INVENTION

Accordingly, the present invention is to provide an apparatus for translating OpenVG API, for providing abundant and diverse contents for a mobile terminal.

Also, the present invention is to provide an apparatus for translating OpenVG API, for promoting high-rate processing of driven contents and a reduction of consumption power in a mobile terminal.

Also, the present invention is to provide a method for translating OpenVG API, for efficiently providing abundant and diverse OpenVG contents to contents developer.

Also, the present invention is to provide a mobile terminal comprising an apparatus for translating OpenVG API and a computer readable record medium storing a program which realizes a method for translating OpenVG API.

In one aspect, there is provided an apparatus for translating OpenVG API. The apparatus comprises a data parsing unit, an OpenVG API script creating unit, and a raster image data output unit. The data parsing unit parses SVG format data depending on a data attribute. The OpenVG API script creating unit extracts an OpenVG API format syntax associated with each of the parsed SVG format data and creates an OpenVG API script. The raster image data output unit creates and outputs raster image data associated with the created OpenVG API script.

The parsing unit may comprise a data reading unit configured to read the SVG format data, a data parser configured to parse the read SVG format data depending on the data attribute, a data analyzing unit configured to check and analyze the parsed SVG format data, and a first storage unit configured to store the analyzed SVG format data on a per-attribute basis.

The data analyzing unit may transmit a result of the checking to the data parser and the data reading unit in sequence.

The OpenVG API script creating unit may comprise a syntax comparator configured to compare the respective parsed SVG format data with data previously stored in a syntax lookup table, a syntax extractor configured to extract an OpenVG API format syntax from the syntax lookup table depending on the comparison result, a script creator configured to combine the extracted OpenVG API format syntax and create the OpenVG API script, and a second storage unit configured to rearrange and store the OpenVG API format syntax of the OpenVG API script depending on an attribute of the created raster image data.

The syntax lookup table may store the OpenVG API format syntax associated with each of the SVG format data.

In another aspect, there is provided a mobile terminal comprising an apparatus for translating OpenVG API.

In a further another aspect, there is provided a method for translating OpenVG API. The method comprises: parsing SVG format data depending on a data attribute; creating an OpenVG API script by extracting an OpenVG API format syntax associated with each of the parsed SVG format data; and creating and outputting raster image data associated with the created OpenVG API script.

The parsing may comprise: reading the SVG format data; parsing the read SVG format data depending on the data attribute; checking and analyzing the parsed SVG format data; and storing the analyzed SVG format data on a per-attribute basis.

Depending on a result of the checking, the parsing and the reading may be repeated.

The creating of the OpenVG API script may comprise: comparing the respective parsed SVG format data with data previously stored in a syntax lookup table; extracting an OpenVG API format syntax from the syntax lookup table depending on the comparison result; creating the OpenVG API script by combining the extracted OpenVG API format syntax; and rearranging and storing the OpenVG API format syntax of the OpenVG API script depending on an attribute of the created raster image data.

The syntax lookup table may store the OpenVG API format syntax associated with each of the SVG format data.

In a yet another aspect, there is provided a computer readable record medium storing a program for executing a method for translating the OpenVG API.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

Figure 1:
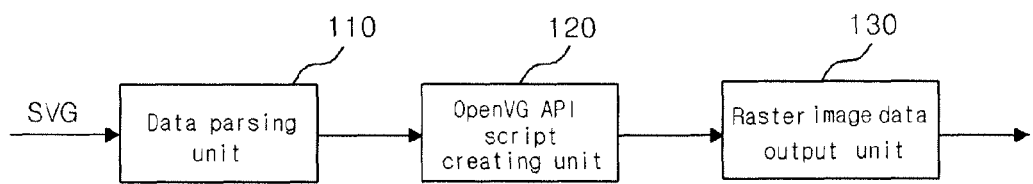
FIG. 1 illustrates an apparatus for translating OpenVG API according to an exemplary embodiment of the present invention.

FIG. 1 illustrates an apparatus for translating OpenVG API according to an exemplary embodiment of the present invention.

As shown in FIG. 1, the OpenVG API translation apparatus comprises a data parsing unit 110, an OpenVG API script creating unit 120, and a raster image data output unit 130.

The data parsing unit 110 parses Scalable Vector Graphic (SVG) format data depending on the attribute of the data. In detail, the data parsing unit 110 reads and parses a web-based XML data file, e.g., a file with a "svg" extension, thereby preparing OpenVG API translation of data. A detailed description of the data parsing unit 110 will be later made with reference to FIGS. 2 and 3.

The OpenVG API script creating unit 120 extracts an OpenVG API format syntax associated with each of the parsed SVG format data and creates an OpenVG API script. The OpenVG API script creating unit 120 comprises a syntax lookup table to extract the OpenVG API format syntax associated with the parsed SVG format data in real time. A detailed description of the OpenVG API script creating unit 120 will be later made with reference to FIG. 4.

The raster image data output unit 130 creates and outputs raster image data in a unit of pixel associated with the OpenVG API script. The outputted raster image data is displayed on a screen of a mobile terminal.

As described above, the OpenVG API translation apparatus according to an exemplary embodiment of the present invention can automatically translate the SVG format data so that it can be used in OpenVG, thereby expressing abundant vector graphic statements of the SVG format data by OpenVG as it stands.

In an exemplary embodiment of the present invention, a mobile terminal can comprise the OpenVG API translation apparatus, thereby expanding a contents expression region of the mobile terminal and promoting high-rate processing and a reduction of consumption power through hardware acceleration of the mobile terminal. Also, contents developer can create abundant and diverse OpenVG contents because SVG format data can be reused. The OpenVG API translation apparatus according to the present invention is no hindrance to any use, if hardware acceleration is needed in OpenVG API translation, as well as the mobile terminal. Contents developer mainly does the translation process using a computer. A computer without the OpenVG API translation apparatus of the present invention can be used to execute the translation process, as long as it has enough processing power to run the program, i.e., software for executing a method for translating an OpenVG API described later with reference to FIG. 5.

Figure 2:
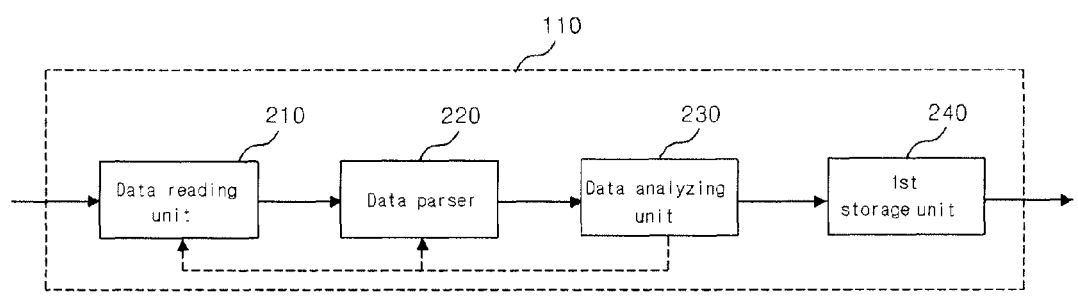
FIGS. 2 and 3 illustrate a data parsing unit according to an exemplary embodiment of the present invention.
Figure 3:
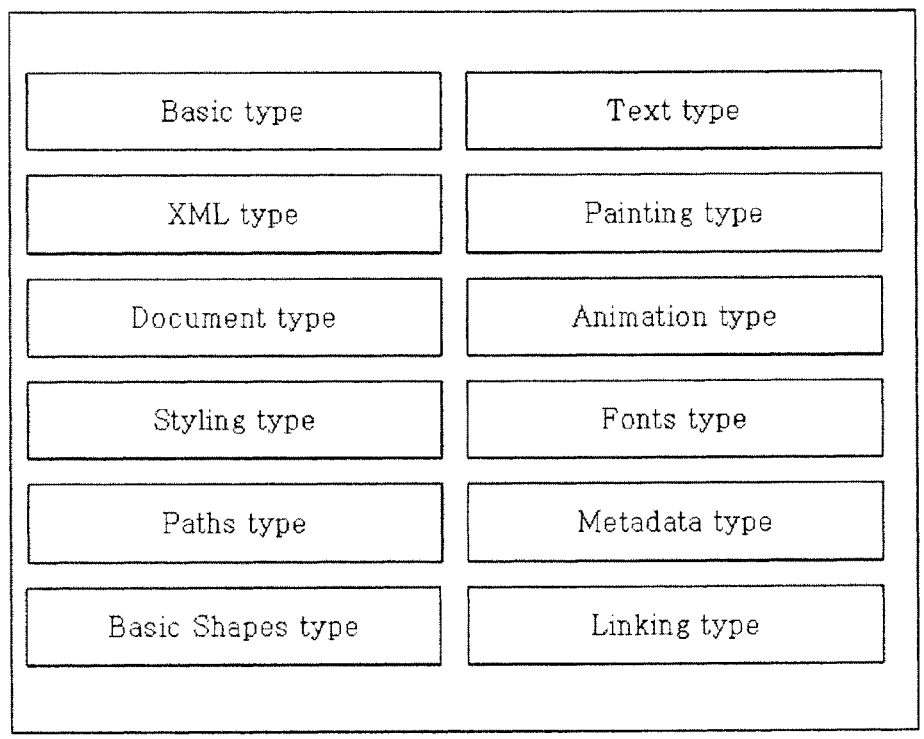

FIG. 2 illustrates the data parsing unit 110 according to an exemplary embodiment of the present invention and FIG. 3 illustrates the data attributes parsed according to an exemplary embodiment of the present invention.

As shown in FIG. 2, the data parsing unit 110 according to an exemplary embodiment of the present invention comprises a data reading unit 210, a data parser 220, a data analyzing unit 230, and a first storage unit 240.

The data reading unit 210 reads SVG format data. The data reading unit 210 reads a header of data inputted to the data parsing unit 110, determines whether the input data is SVG format data, and sequentially reads the input data up to the last field.

The data parser 220 parses the read SVG format data depending on a data attribute predefined by the data parsing unit 110. The data attribute is distinguished and defined depending on information type such as a basic type, a text type, an XML type, etc. of FIG. 3 that each data intends to express.

The data analyzing unit 230 checks and analyzes the parsed SVG format data. Before analyzing, the data analyzing unit 230 checks whether the parsed SVG format data is normal or abnormal. In case that it checked the SVG format data is abnormal, the data analyzing unit 230 informs the data parser 220 that the SVG format data is abnormal, and the data parser 220 again parses the SVG format data. In case that it checked the SVG format data is abnormal again from the re-parsed SVG format data, the data analyzing unit 230 informs the data reading unit 210 that the SVG format data is abnormal, and the data reading unit 210 reads SVG format data again. Here, the checking is limited to the predetermined number of times, thereby preventing an infinite loop. In other words, according to an exemplary embodiment of the present invention, the data analyzing unit 230 transmits the data check result to the data parser 220 and the data reading unit 210 sequentially when needed, thereby detecting an abnormality or normality of SVG format data before translation. After that, the data analyzing unit 230 analyzes the SVG format data for data translation.

The first storage unit 240 stores the analyzed SVG format data on a per-attribute basis. In detail, the first storage unit 240 can store the analyzed SVG format data on a per-attribute basis in a divided storage region for each attribute and transmit the SVG format data to the OpenVG API script creating unit 120 in real time, thereby improving a processing rate. For the improvement of processing rate, it is desirable that the first storage unit 240 is comprised of an internal Random Access Memory (RAM).

Figure 4:
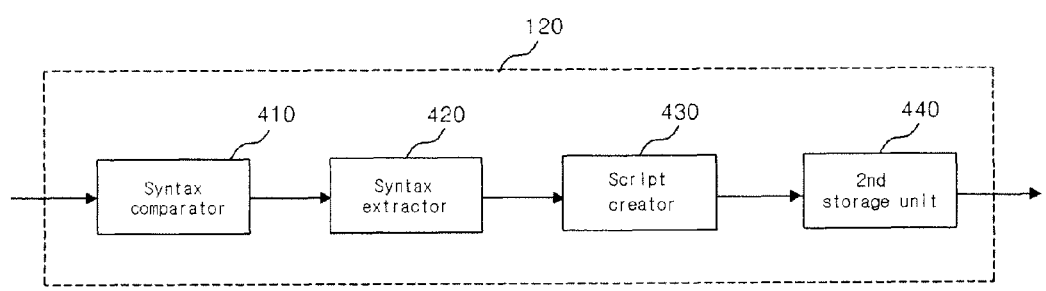
FIG. 4 illustrates an OpenVG API script creating unit according to an exemplary embodiment of the present invention.

FIG. 4 illustrates the OpenVG API script creating unit according to an exemplary embodiment of the present invention.

As shown in FIG. 4, the OpenVG API script creating unit 120 according to an exemplary embodiment of the present invention comprises a syntax comparator 410, a syntax extractor 420, a script creator 430, and a second storage unit 440.

The syntax comparator 410 compares each data with data previously stored in the syntax lookup table. The syntax lookup table (not shown) stores an Open VG API format syntax associated with each of SVG format data. Accordingly, the syntax comparator 410 compares the SVG format data received from the data parsing unit 110 with SVG format data stored in the syntax lookup table, by one-to-one matching or substitution. By doing so, the syntax comparator 410 can check whether there is the same or similar SVG format data and also, detect a matched syntax. This can lead to the improvement on a rate of translation processing and the guarantee for a reliability of translation processing.

The syntax extractor 420 extracts the OpenVG API format syntax associated with the SVG format data from the syntax lookup table depending on the comparison result.

The script creator 430 combines the extracted syntax and creates the OpenVG API script. According to an exemplary embodiment of the present invention, the OpenVG API script is displayed on a screen via the raster image data output unit 130. However, the OpenVG API script can be provided to one or more contents developers to be used for contents development.

The second storage unit 440 rearranges and stores a syntax of the OpenVG API script depending on an attribute of the created raster image data. The second storage unit 440 rearranges and stores the syntax of the OpenVG API script and transmits the stored syntax to the raster image data output unit 130, thereby increasing the speed of creating raster image data in the raster image data output unit 130. It is desirable that the syntax is tabled to be stored on a per-attribute basis.

Figure 5:
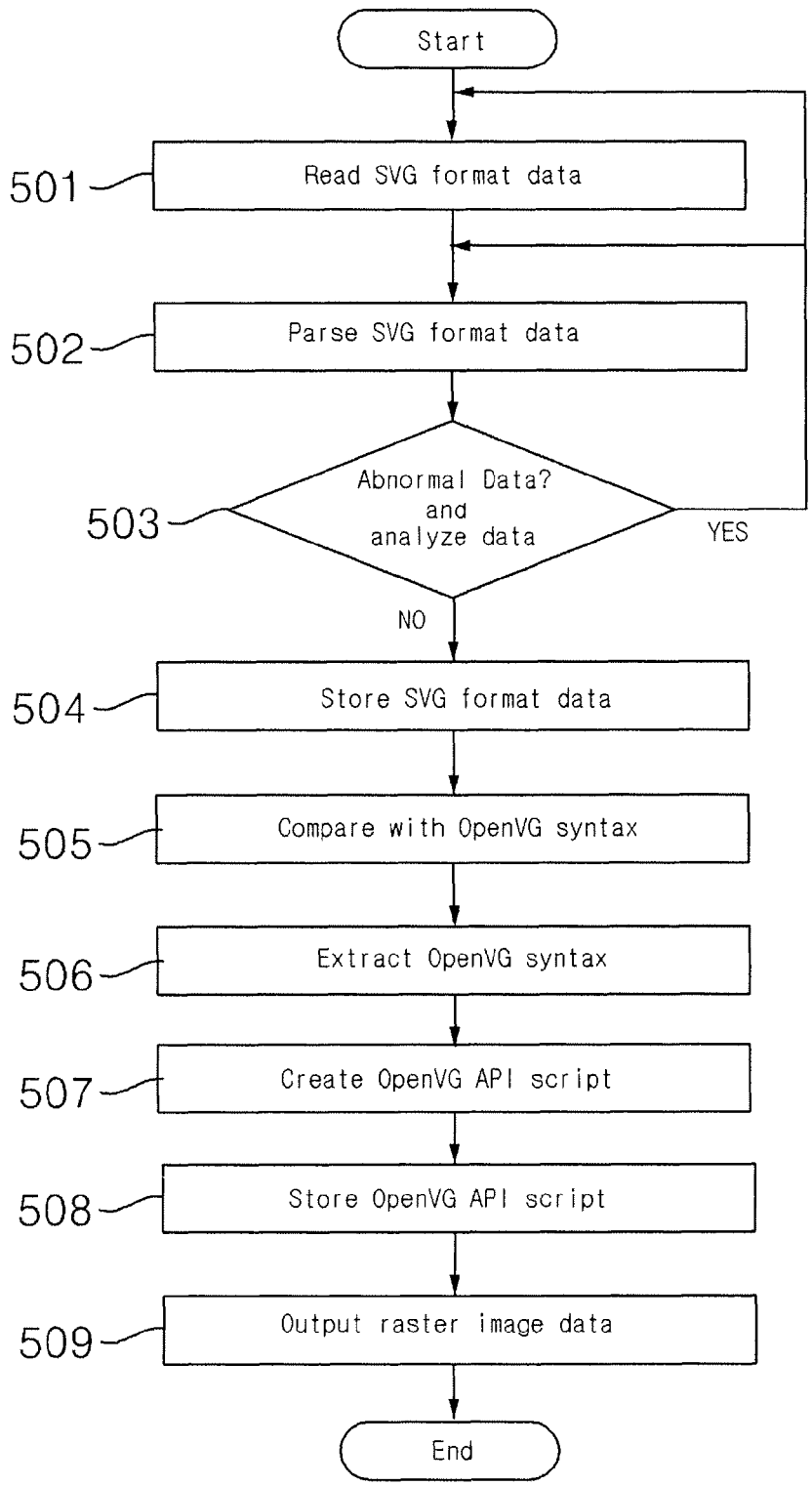
FIG. 5 is a flowchart illustrating a method for translating OpenVG API according to an exemplary embodiment of the present invention.

FIG. 5 is a flowchart illustrating a method for translating the OpenVG API according to an exemplary embodiment of the present invention.

As shown in FIG. 5, the method for translating OpenVG API according to an exemplary embodiment of the present invention comprises parsing the SVG format data depending on a data attribute, which comprises the substeps 501 to 504. In detail, in the Step 501, input SVG format data is read. In the Step 502, the read SVG format data is parsed depending on a data attribute. In the Step 503, it is checked that the parsed SVG format data is abnormal, and the SVG format data is analyzed. In the Step 503, in case that the parsed SVG format data is determined to be abnormal at first, the Step 502 is repeated. And in case that the parsed SVG format data is determined to be abnormal again, the Step 501 and the Step 502 are repeated. Here, the repetition times is limited to a finite number, thereby preventing the infinite repetition. In the Step 503, in case that the parsed SVG format data is determined to be normal, then the parsed SVG format data is analyzed. In the Step 504, the analyzed SVG format data is stored on a per-attribute basis.

The OpenVG API translation method according to an exemplary embodiment of the present invention comprises, after the steps 501 to 504, Step of creating an OpenVG API script which comprises the substeps 505 to 508. In more detail, in the Step 505, each of the stored SVG format data is compared with data previously stored in a syntax lookup table. The syntax lookup table stores the OpenVG API format syntax associated with each of the SVG format data. In the Step 506, the OpenVG API format syntax is extracted from the syntax lookup table depending on the comparison result. In the Step 507, the extracted OpenVG API format syntax is combined and an OpenVG API script is created. In the Step 508, a syntax of the OpenVG API script is rearranged and stored depending on an attribute of the created raster image data.

In Step 509, raster image data associated with the rearranged and stored script is created and outputted. Here, a method for outputting the raster image data varies depending on an operation system for executing the outputting method.

As described above, the OpenVG API translation method according to an exemplary embodiment of the present invention can automatically translate the SVG format data so that it can be used in OpenVG, thereby expressing abundant vector graphic statements of the SVG format data by OpenVG as it stands. Also, a contents developer can create abundant and diverse OpenVG contents because SVG format data can be reused. As described above, the present invention has an effect of translating the SVG format data by OpenVG API, thereby providing abundant and diverse contents to a mobile terminal.

Also, the present invention has an effect of promoting high-rate processing of driven contents and a reduction of power consumption in the mobile terminal.

Also, the present invention has an effect of providing abundant and diverse OpenVG contents to a contents developer with a great efficiency.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for translating open Vector Graphic (OpenVG) Application Program Interface (API) applied to a mobile terminal, the apparatus comprising:
   a data parsing unit configured to parse Scalable Vector Graphic (SVG) format data depending on an attribute of the data, wherein the attribute of the data is distinguished and defined depending on information type including a basic type, a text type and eXtensible Markup Language (XML) type;
   an OpenVG API script creating unit configured to create an OpenVG API script by extracting an OpenVG API format syntax associated with each of the parsed SVG format data; and
   a raster image data output unit configured to create and output a raster image data associated with the created OpenVG API script,
   wherein the OpenVG API script creating unit comprises a second storage unit configured to rearrange and store the OpenVG API format syntax of the OpenVG API script depending on an attribute of the raster image data.

2. The apparatus of claim 1, wherein the parsing unit comprises:
   a data reading unit configured to read the SVG format data;
   a data parser configured to parse the read SVG format data depending on the attribute of the data;
   a data analyzing unit configured to check and analyze the parsed SVG format data; and
   a first storage unit configured to store the analyzed SVG format data on a per-attribute basis.

3. The apparatus of claim 2, wherein the data analyzing unit transmits a result of the checking to the data parser and the data reading unit sequentially.

4. The apparatus of claim 3, wherein, if the SVG format data is checked to be abnormal, the data parser is configured to parse the SVG format data again, and if the re-parsed SVG format data is checked to be abnormal, the data reading unit is configured to read the SVG format data again.

5. The apparatus of claim 4, wherein the syntax lookup table stores the OpenVG API format syntax associated with each of the SVG format data.

6. The apparatus of claim 2, wherein the data analyzing unit is configured to check the SVG format data up to a predetermined number of times.

7. The apparatus of claim 2, wherein the first storage unit is configured to store analyzed SVG format data on a per-attribute basis in a divided storage region for each attribute, and configured to transmit the SVG format data to the OpenVG API script creating unit.

8. The apparatus of claim 1, wherein the OpenVG API script creating unit comprises:
   a syntax comparator configured to compare the respective parsed SVG format data with data previously stored in a syntax lookup table;
   a syntax extractor configured to extract an OpenVG API format syntax from the syntax lookup table depending on the comparison result; and
   a script creator configured to create the OpenVG API script by combining the extracted OpenVG API format syntax.

9. The apparatus of claim 8, wherein the syntax comparator is configured to compare the SVG format data received from the data parsing unit with SVG format data stored in the syntax lookup table by one-to-one matching or substitution.

10. The apparatus of claim 8, wherein the OpenVG script is displayed on a screen via the raster image data output unit.

11. The apparatus of claim 8, wherein the OpenVG script is provided to at least one contents developer to be used for contents development.

12. A mobile terminal comprising an apparatus for translating OpenVG API, the apparatus comprising:
   a data parsing unit configured to parse SVG format data depending on an attribute of the data, wherein the attribute of the data is distinguished and defined depending on information type including a basic type, a text type and eXtensible Markup Language (XML) type;
   an OpenVG API script creating unit configured to create an OpenVG API script by extracting an OpenVG API format syntax associated with each of the parsed SVG format data; and
   a raster image data output unit configured to create and output a raster image data associated with the created OpenVG API script,
   wherein the OpenVG API script creating unit comprises a second storage unit configured to rearrange and store the OpenVG API format syntax of the OpenVG API script depending on an attribute of the raster image data.

13. A method for translating OpenVG API applied to a mobile terminal, the method comprising:
   parsing SVG format data depending on a data attribute, wherein the data attribute is distinguished and defined depending on information type including a basic type, a text type and eXtensible Markup Language (XML) type;
   creating an OpenVG API script by extracting an OpenVG API format syntax associated with each of the parsed SVG format data; and
   creating and outputting a raster image data associated with the created OpenVG API script,
   wherein the creating an OpenVG API script comprises rearranging and storing the OpenVG API format syntax of the OpenVG API script depending on an attribute of the raster image data.

14. The method of claim 13, wherein the parsing comprises:
   reading the SVG format data;
   parsing the read SVG format data depending on the data attribute;
   checking and analyzing the parsed SVG format data; and
   storing the analyzed SVG format data on a per-attribute basis.

15. The method of claim 14, depending on a result of the checking, the parsing and the reading are repeated.

16. The method of claim 15, wherein the checking, parsing and reading are repeated up to a predetermined number of times.

17. The method of claim 13, wherein the creating an OpenVG API script comprises:
   comparing the respective parsed SVG format data with data previously stored in a syntax lookup table;
   extracting an OpenVG API format syntax from the syntax lookup table depending on the comparison result; and
   creating the OpenVG API script by combining the extracted OpenVG API format syntax.

18. The method of claim 17, wherein the syntax lookup table stores the OpenVG API format syntax associated with each of the SVG format data.

19. A non-transitory computer readable record medium storing a program for executing a method for translating an OpenVG API, the method comprising:
   parsing SVG format data depending on a data attribute, wherein the data attribute is distinguished and defined depending on information type including a basic type, a text type and eXtensible Markup Language (XML) type;
   creating an OpenVG API script by extracting an OpenVG API format syntax associated with each of the parsed SVG format data; and
   creating and outputting a raster image data associated with the created OpenVG API script,
   wherein the creating an OpenVG API script comprises rearranging and storing the OpenVG API format syntax of the OpenVG API script depending on an attribute of the raster image data.

20. The non-transitory computer readable record medium of claim 19, wherein the parsing comprises:
   reading the SVG format data;
   parsing the read SVG format data depending on the data attribute; and
   checking and analyzing the parsed SVG format data.

* * * * *